Patented July 22, 1952

2,604,482

UNITED STATES PATENT OFFICE 2,604,482

PROCESS OF MANUFACTURING ORGANIC ACIDS, ESTERS AND ALCOHOLS

Géza Austerweil, Paris, France, assignor to Pechiney-Compagnie de Produits Chimiques et Electrométallurgiques, a corporation of France No Drawing. Application April 17, 1950, Serial No. 156,507. In France April 28, 1949

9 Claims. (Cl. 260—410.9)

The present invention has for one of its objects a process for manufacturing organic acids by the hydrolysis of their esters, which process constitutes an improvement on the process wherein soluble bases are used to catalyze the hydrolysis. The process of the invention may also be applied to the direct transformation of an ester into another ester by alcoholysis with a suitable alcohol. Further, the present invention makes it possible to obtain in a simple and convenient way many alcohols, including those which are found in nature as a constituent part of many vegetable and animal products, such as certain essential and other oils, fats and waxes.

According to the invention, insoluble organic anion exchangers are used as catalysts to promote the respective hydrolysis and alcoholysis reactions.

The reactions involved in the processes to which the present invention is applied may be represented by the general equation:

$$R-\underset{\underset{O}{\|}}{C}-OR' + R''-OH \rightleftarrows R-\underset{\underset{O}{\|}}{C}-OR'' + R'OH$$

where R and R' represent organic radicals and R'' represents hydrogen or an organic radical. Stated in broad terms, the present invention relates to an improvement in the process of reacting organic esters with an OH-containing compound of the group consisting of water and alcohols.

The substitution of a soluble base, i. e. the catalyst used by the prior art, by an anion exchanger of the present invention, presents great advantages. In particular, it enables the ready separation of the catalyst from the resultant product and facilitates the handling of the latter. Moreover, where the esterified acid is a strong acid, it combines in whole or in part, upon being set free, with the anion exchanger and the formed alcohol can thus be readily separated from the reaction medium by filtration and distillation at atmospheric pressure or by vacuum distillation, or by entrainment with steam before or after filtration, or by any other appropriate means. Moreover, the anion exchangers whose activity has become exhausted can be readily regenerated for further use by treatment with an alkali e. g. with dilute alkaline solutions. Further, the invention may also be carried out at atmospheric pressure. The use of autoclaves is therefore rendered unnecessary and a very simple apparatus can be used in carrying out the invention.

The process of the present invention is particularly valuable for the preparation of esters such as the alkyl esters of higher fatty acids by the alcoholysis of glycerides contained in natural fats.

In order to obtain good yields in all of these operations, it is advisable to use the water or the alcohol employed in the reaction in excess of stoichiometric proportions.

As anion exchangers for carrying out the present invention there can be used amine resins, such as furfuraldehyde-meta-phenylene-diamine resins, formaldehyde-amino-ethylene-urea resins, polyaminostyrolene resins, etc., and especially those whose amino-groups have been rendered tertiary or quaternary by a suitable treatment, for example by methylation by methyl-sulfate.

The following examples are given solely by way of illustration of the invention, and not by way of limitation of either the esters treated, the proportions of the reagents or the anion exchangers used.

Example 1

To 100 grams of essence of sweet lavender containing 55% of linalol acetate (as determined by alkaline saponification), there are added 30 grams of an anion exchanger in a basic state, such as meta-phenylene-diamine-formaldehyde resin or formaldehyde-amino-ethylene-urea resin, or their quaternary amino products, and the mixture is heated under reflux conditions with 250 cc. of water for ¾ hour to 1 hour. The reaction mixture is thereupon subjected to entrainment with steam, yielding a distillate from which it is possible to isolate by intensive fractionation 39 grams of very pure linalol boiling at 85° C. at 10 mm. pressure.

Example 2

Amyl salicylate is treated with excess of water in the presence of an anion exchanger in the manner indicated in Example 1. The anion exchanger retains a portion of the salicylic acid formed by hydrolysis, this portion being the greater the higher the polarity of the anion exchanger; the remainder of the acid is separated by decanting from the reaction mixture the aqueous liquor which contains, in addition to amyl alcohol, free salicylic acid. To recover the free salicylic acid, the amyl alcohol and to regenerate the anion exchanger, the procedure is as follows: The anion exchanger is washed with a 2% sodium carbonate solution, and the aqueous alkaline wash liquor is saved for use as indicated below. The exchanger is then rinsed with the distilled or demineralized water, until all alkaline reaction disappears. The anion exchanger, thus regenerated, may be used in a new operation. The liquor decanted from the original reaction mixture—as indicated above—is now alkalized and steam distilled to recover the amyl alcohol. The alkalized aqueous liquors from both operations described above are combined, concentrated and suitably treated with an acid to recover free salicylic acid.

*Example 3*

To 100 parts by weight of melted crude coconut butter, there are added 35 parts by weight of an anion exchanger such as described in Example 1, and 400 to 600 (preferably, 500) parts by weight of absolute ethyl alcohol. The mixture is heated and refluxed for 1 and ½ to 2 hours. The excess alcohol is removed by distillation, while the anion exchanger is separated from the residue of the distillation by decanting the latter in a hot condition. The formed ethyl laurate can be recovered from the decanted residue by subjecting the residue to rectification under vacuum conditions.

*Example 4*

The operation is the same as in Example 3, except that the absolute ethyl alcohol is replaced by pure methyl alcohol boiling at 64° C. Methyl laurate is obtained as one of the final products.

What I claim is:

1. The improvement in the method of reacting carboxylic acid esters with an OH-containing compound of the group consisting of water and alcohols under conditions effective to secure hydrolysis and alcoholysis respectively, which consists in carrying out the reaction in the presence of an insoluble organic basic anion exchange compound.

2. A method according to claim 1 in which the OH-containing compound is used in excess of stoichiometric proportions.

3. A process according to claim 1 in which the spent anion exchange compound is regenerated for further use by treating it with an alkali compound.

4. A process according to claim 3 in which the anion exchange compound is regenerated with a dilute alkaline solution.

5. A process according to claim 1 in which the resins used as anion exchangers comprise the condensation product of aldehydes and amines.

6. A process according to claim 5 in which the alkalinity of the anion exchanger used has been enhanced by transforming its amino groups into tertiary amines.

7. A process according to claim 5 in which the alkalinity of the anion exchanger used has been enhanced by transforming its amino groups into quaternary amines.

8. A process according to claim 1 in which alkyl esters of higher fatty acids are produced by alcoholysis of glycerides contained in natural fats.

9. A process according to claim 8 in which an alkyl laurate is produced from crude coconut butter by alcoholysis with an aliphatic alcohol.

GÉZA AUSTERWEIL.

REFERENCES CITED

The following references are of record in the file of this patent:

UNITED STATES PATENTS

| Number | Name | Date |
|---|---|---|
| 2,494,366 | Sprules | Jan. 10, 1950 |

OTHER REFERENCES

Sussman: Ind. & Eng. Chem. 38 (1946), pages 1228–30.

Winters et al.: Ind. and Eng. Chem., vol. 41, March 1, 1949, pages 460–463.